(12) United States Patent
Lee (10) Patent No.: US 9,575,506 B2
(45) Date of Patent: Feb. 21, 2017

(54) PROTECTING CASING FOR A PORTABLE ELECTRONIC DEVICE

(71) Applicant: ABA UFO International Corp., New Taipei (TW)

(72) Inventor: Miko Lee, New Taipei (TW)

(73) Assignee: ABA UFO International Corp., New Taipei (TW)

( * ) Notice: Subject to any disclaimer, the term of this patent is extended or adjusted under 35 U.S.C. 154(b) by 441 days.

(21) Appl. No.: 14/324,736

(22) Filed: Jul. 7, 2014

(65) Prior Publication Data

US 2016/0007487 A1    Jan. 7, 2016

(51) Int. Cl.
| | | |
|---|---|---|
| *B65D 85/00* | (2006.01) | |
| *G06F 1/16* | (2006.01) | |
| *H04M 1/18* | (2006.01) | |
| *A45C 11/00* | (2006.01) | |

(52) U.S. Cl.
CPC ........ *G06F 1/1626* (2013.01); *A45C 2011/002* (2013.01); *A45C 2200/15* (2013.01); *G06F 2200/1633* (2013.01); *H04M 1/185* (2013.01)

(58) Field of Classification Search
CPC ........... G06F 1/1626; G06F 2200/1633; A45C 2200/15; H05K 5/0013; H05K 5/0086; H05K 5/0221; H05K 5/0239
USPC ........ 206/320, 1.5, 576, 45.2; 70/18, 19, 58; 361/679.01, 679.02; 455/575.1, 575.8
See application file for complete search history.

(56) References Cited

U.S. PATENT DOCUMENTS

| | | | | |
|---|---|---|---|---|
| 6,955,068 B2* | 10/2005 | Gelardi | ............... | E05B 73/0023 206/1.5 |
| 7,007,912 B1* | 3/2006 | Giuliani | .............. | E05B 73/0082 248/552 |
| 8,418,514 B1* | 4/2013 | Su | ........................ | E05B 73/0005 70/14 |
| 9,078,350 B1* | 7/2015 | Phillips | ................ | F16M 13/022 |
| 2003/0029754 A1* | 2/2003 | Scicluna | ................ | A45C 13/40 206/320 |
| 2015/0041622 A1* | 2/2015 | Mulhern | .............. | F16M 11/041 248/688 |
| 2015/0227178 A1* | 8/2015 | Rayner | ................... | G06F 1/163 361/679.4 |
| 2016/0309010 A1* | 10/2016 | Carnevali | ................ | H04M 1/11 |

* cited by examiner

*Primary Examiner* — Jacob K Ackun
*Assistant Examiner* — Rafael Ortiz
(74) *Attorney, Agent, or Firm* — C. G. Mersereau; Nikolai & Mersereau, P.A.

(57) ABSTRACT

A protecting casing for a portable electronic device has a shell and a detachable actuating panel. The actuating panel has a curved clamping sheet crossing over a front edge of the portable electronic device. A lock cylinder is mounted between the shell and the actuating panel. When the lock cylinder is locked, the actuating panel is secured. When the lock cylinder is unlocked, the actuating panel is detachable. Therefore, the actuating panel increases the stability for the protecting casing to be mounted around the portable electronic device. Further, a bolt is connected detachably to the actuating panel and the shell to selectively fasten the protecting casing and the portable electronic device at a fixed position so that the portable electronic device is kept from being stolen.

20 Claims, 12 Drawing Sheets

PROTECTING CASING FOR A PORTABLE ELECTRONIC DEVICE

BACKGROUND OF THE INVENTION

1. Field of the Invention

The present invention relates to a protecting casing, especially to a protecting casing for a portable electronic device.

2. Description of the Prior Arts

Portable electronic devices such as tablet PCs, cell phones become necessary items for people in modern lives. To enhance the visual effect or to protect the portable electronic device, a protecting casing is mounted around the electronic device.

A conventional protecting casing comprises a base. A peripheral edge of the base is bent to form a surrounding wall. A peripheral edge of the surrounding wall is bent to form an annular flange. When the conventional protecting casing is mounted around the electronic device, the base covers the bottom of the electronic device, and the annular flange abuts the peripheral edge of the top of the electronic device to position the conventional protecting casing on the portable electronic device. However, the conventional protecting casing only uses the annular flange to position the portable electronic device so that the stability for the conventional protecting casing to position the portable electronic device is insufficient. When external forces accidentally act on the portable electronic device with the conventional protecting casing, the conventional protecting casing may be easily separated from the portable electronic device so that the portable electronic device loses the protection.

To overcome the shortcomings, the present invention provides a protecting casing for a portable electronic device to mitigate or obviate the aforementioned problems.

SUMMARY OF THE INVENTION

The main objective of the present invention is to provide a protecting casing having enhanced stability to be mounted around the portable electronic device. The protecting casing has a shell and a detachable actuating panel. The actuating panel has a curved clamping sheet crossing over a front edge of the portable electronic device. A lock cylinder is mounted between the shell and the actuating panel. When the lock cylinder is locked, the actuating panel is secured. When the lock cylinder is unlocked, the actuating panel is detachable. Therefore, the actuating panel increases the stability for the protecting casing to be mounted around the portable electronic device. Further, a bolt is connected detachably to the actuating panel and the shell to selectively fasten the protecting casing and the portable electronic device at a fixed position so that the portable electronic device is kept from being stolen.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
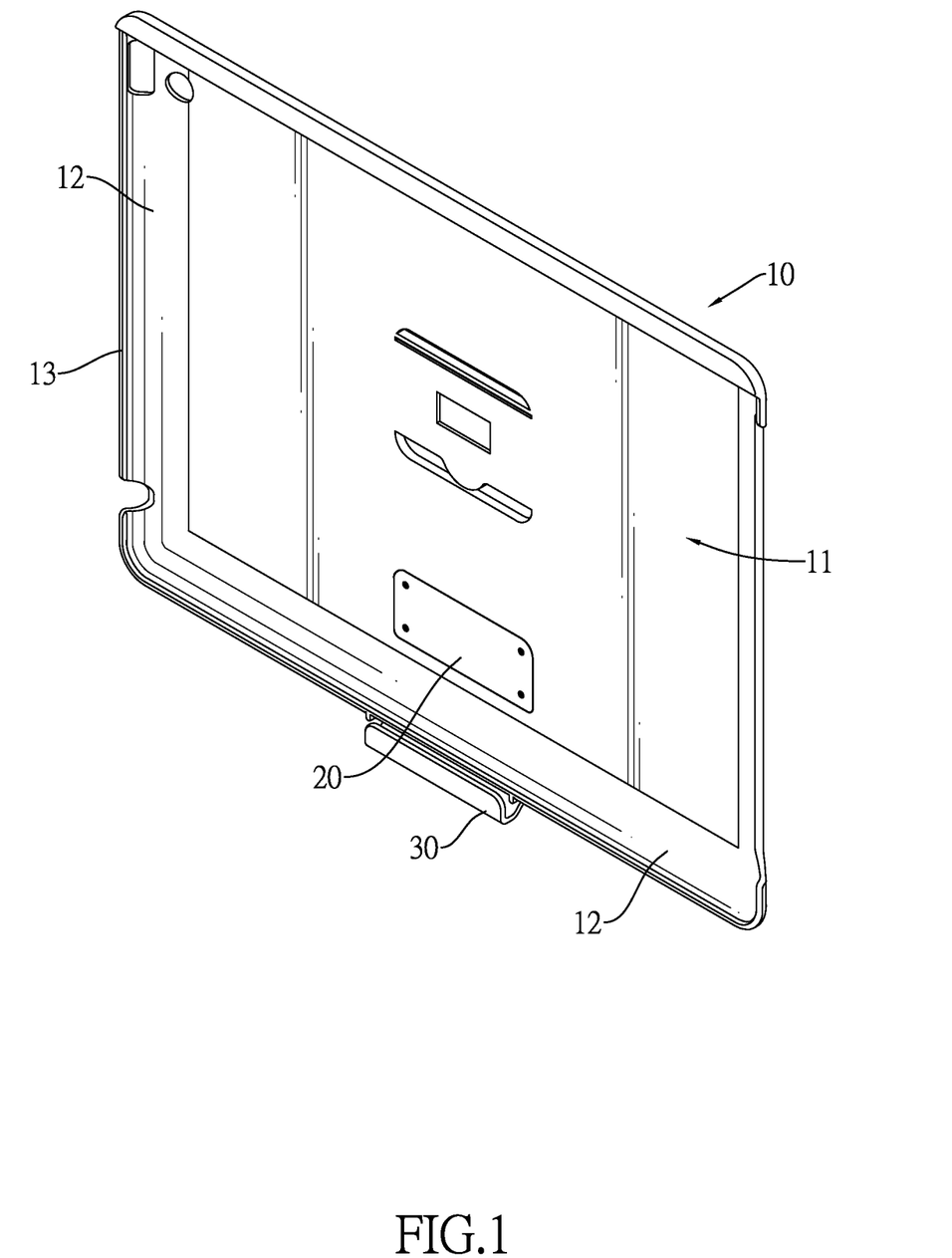
FIG. 1 is a perspective view of a protecting casing for a portable electronic device in accordance with the present invention.
Figure 2:
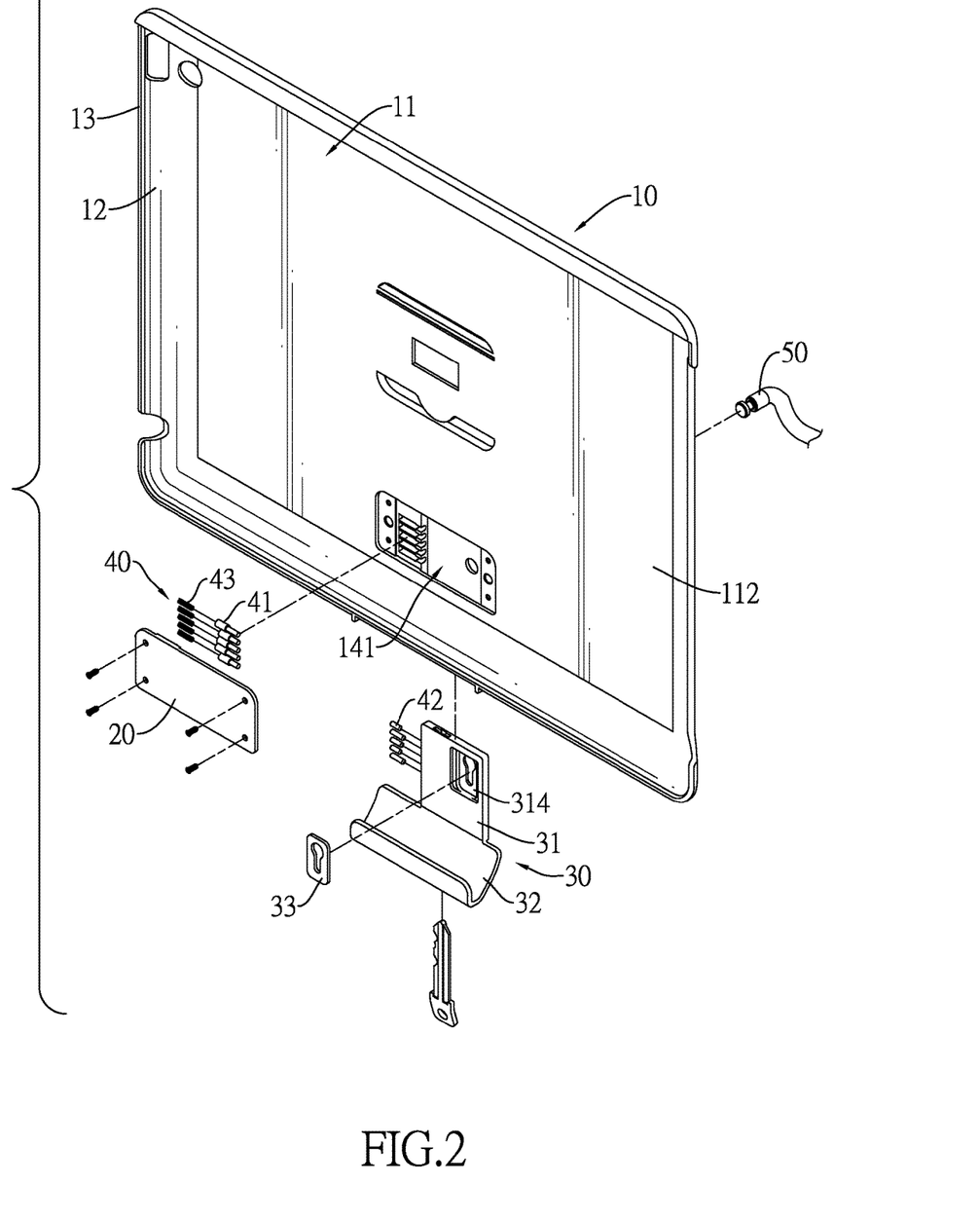
FIG. 2 is an exploded perspective view of the protecting casing in FIG. 1 with a key.

With reference to FIGS. 1 and 2, a protecting casing in accordance with the present invention comprises a shell 10, a receiving panel 20, an actuating panel 30, a lock cylinder 40 and a bolt 50.

Figure 3:
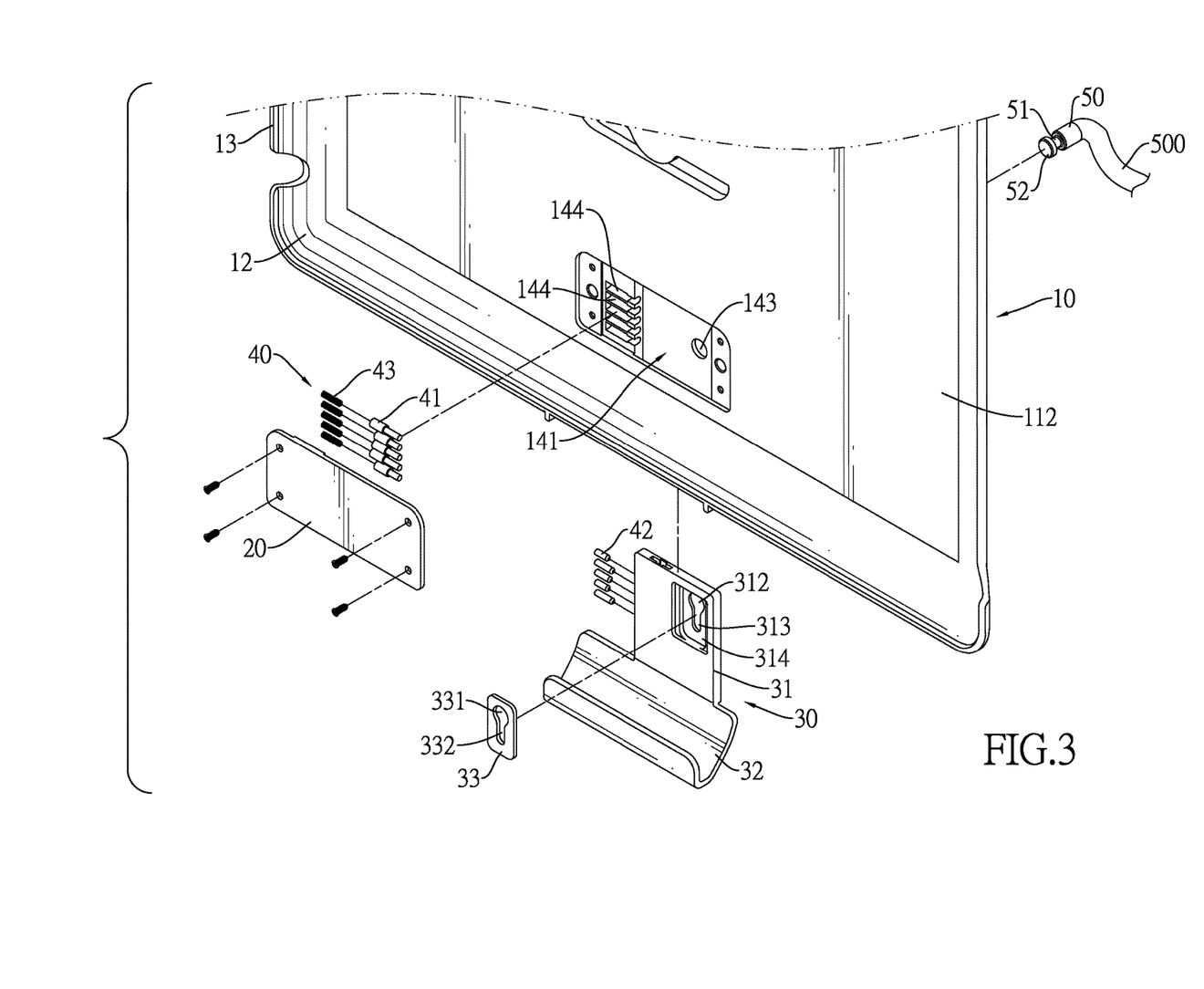
FIG. 3 is an enlarged exploded perspective view of the protecting casing in FIG. 1.
Figure 4:
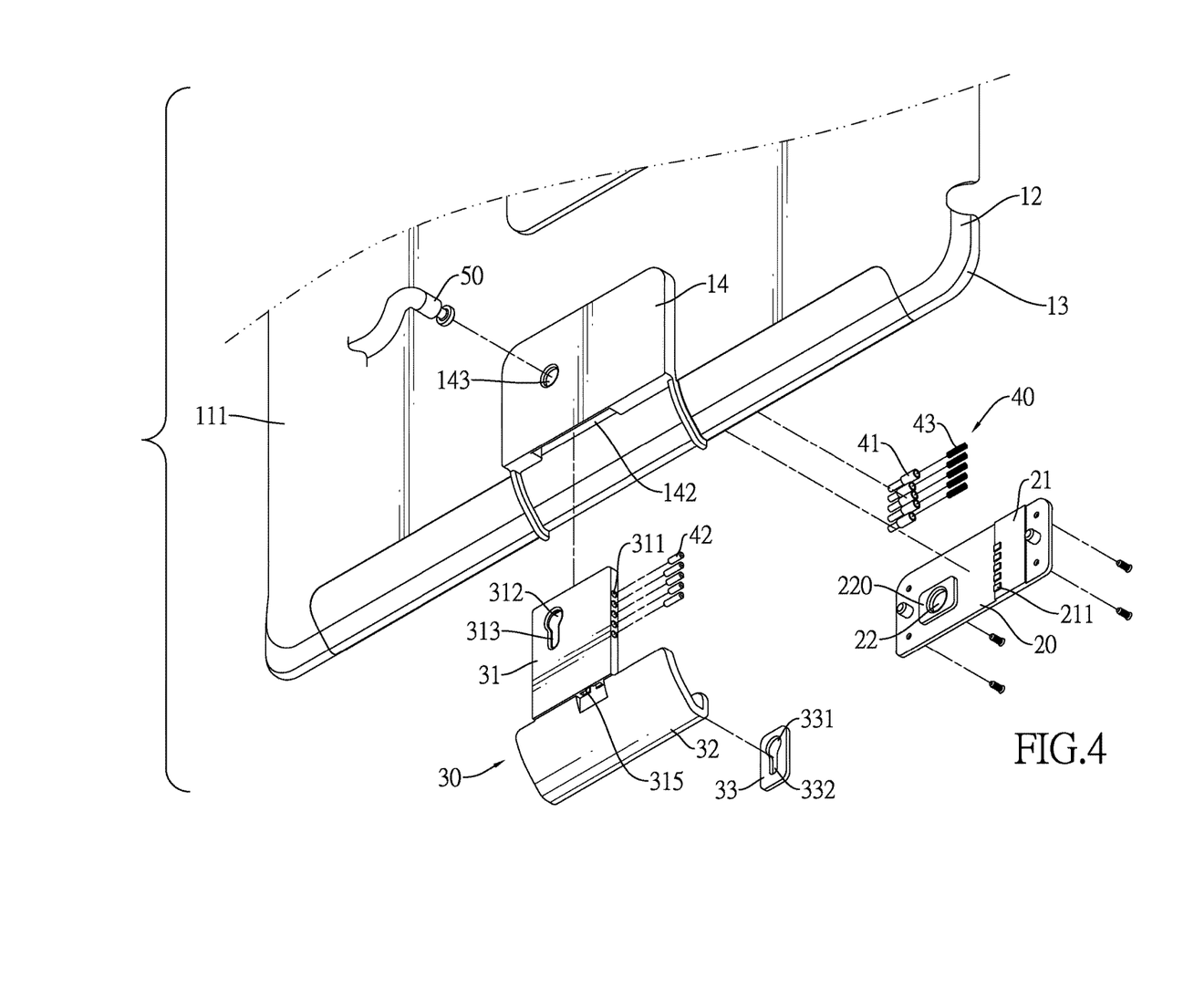
FIG. 4 is another enlarged exploded perspective view of the protecting casing in FIG. 1.

With reference to FIGS. 2 to 4, the shell 10 has a base 11 and a lid 14. A peripheral edge of the base 11 is bent to form a surrounding wall 12. A peripheral edge of the surrounding wall 12 is bent to form an annular flange 13. The lid 14 is formed on a rear surface 111 of the base 11 and is formed near a side of the annular flange 13. The base 11 has a receiving space 141 formed therethrough and corresponding to the lid 14. The lid 14 has an opening 142, a bolt hole 143, a stepped surface and multiple pin grooves 144. The opening 142 is formed through an end of the lid 14. The bolt hole 143 is formed through a rear surface of the lid 14. The stepped surface is formed on the lid 14. The pin grooves 144 are formed on the stepped surface and communicate with the receiving space 141.

The receiving panel 20 is mounted securely on a front surface 112 of the base 11 and covers the receiving space 141. The receiving panel 20 has a stepped surface 21, multiple protrusions 211 and a bolt recess 22. The stepped surface 21 is formed on the receiving panel 20. The protrusions 211 are formed on the stepped surface 21 of the receiving panel 20. Each protrusion 211 of the receiving panel 20 corresponds to one of the pin grooves 144 on the lid 14. The bolt recess 22 is formed on the receiving panel 20 and aligns with the bolt hole 143 of the lid 14.

The actuating panel 30 is connected detachably to the shell 10 and the receiving panel 20 and comprises a mounting sheet 31, a clamping sheet 32 and an auxiliary sheet 33.

The mounting sheet 31 is mounted slidably between the lid 14 and the receiving panel 20 through the opening 142 of the lid 14 and is mounted slidably in the receiving space 141 of the shell 10. The mounting sheet 31 has multiple pin recesses 311, a bolt hole 312, a passage 313, a bolt recess 314 and a keyhole 315. The pin recesses 311 are formed on a side edge of the mounting sheet 31. Each pin recess 311 of the mounting sheet 31 selectively aligns with one of the pin grooves 144 of the lid 14. The bolt hole 312 and the passage 313 are formed through the mounting sheet 31, communicate with each other, and selectively align with the bolt recess 22 of the receiving panel 20 and the bolt hole 143 of the lid 14. A width of the passage 313 of the mounting sheet 31 is smaller than a diameter of the bolt hole 312 of the mounting sheet 31, is smaller than a diameter of the bolt recess 22 of the receiving panel 20, and is smaller than a diameter of the bolt hole 143 of the lid 14. The bolt recess 314 is formed on a front surface of the mounting sheet 31 and corresponds to and communicates with the bolt hole 312 and the passage 313 of the mounting sheet 31. The receiving panel 20 may have a stage 220 extending from the receiving panel 20 and formed around the bolt recess 22. The stage 220 of the receiving panel 20 is mounted in the bolt recess 314 to form a stopping structure so that the stage 220 keeps the mounting sheet 31 from leaving the shell 10 when the mounting sheet 31 moves in the receiving space 141. However, the aforementioned stopping structure is illustrative only and the present invention is not limited to that. The keyhole 315 is formed through an end of the mounting sheet 31 and communicates with the pin recesses 311.

The clamping sheet 32 is curved, is formed on and extends from the end of the mounting sheet 31, and crosses over a lower edge of the surrounding wall 12 and a front edge of the annular flange 13 of the shell 10.

The auxiliary sheet 33 has a bolt hole 331 and a passage 332 formed therethrough and is mounted in the bolt recess 314 of the mounting sheet 31. The bolt hole 331 of the auxiliary sheet 33 aligns with and has the same size with the bolt hole 312 of the mounting sheet 31. The passage 332 of the auxiliary sheet 33 aligns with and has the same size with the passage 313 of the mounting sheet 31.

The lock cylinder 40 is mounted in the receiving space 141 of the shell 10 and comprises multiple front locking pins 41, multiple rear locking pins 42 and multiple springs 43. The front locking pins 41 are mounted respectively in the pin grooves 144 of the lid 14, are pressed respectively by the protrusions 211 of the receiving panel 20 and selectively extend respectively into the pin recesses 311 of the mounting sheet 31. The rear locking pins 42 are mounted respectively in the pin recesses 311 of the mounting sheet 31 of the actuating panel 30 and respectively abut against the front locking pins 41. The springs 43 are mounted respectively in the pin grooves 144 of the lid 14. Each spring 43 is clamped between a corresponding front locking pin 41 and an inner wall of the lid 14.

The bolt 50 is mounted detachably through the lid 14, the mounting sheet 31 of the actuating panel 30, and the receiving panel 20. The bolt 50 has a neck 51 formed on an end of the bolt 50, while the bolt 50 is connected to a cable 500 on the other end of the bolt 50. An enlarged head 52 is formed on an end of the neck 51. An outer diameter of the enlarged head 52 is larger than an outer diameter of the neck 51. The outer diameter of the enlarged head 52 corresponds to the diameters of the bolt hole 143 of the lid 14, the bolt hole 312 of the mounting sheet 31, the bolt hole 331 of the auxiliary sheet 33, and the bolt recess 22 of the receiving panel 20 so that the bolt 50 can pass through the bolt hole 143 of the lid 14, the bolt hole 312 of the mounting sheet 31, the bolt hole 331 of the auxiliary sheet 33, and the bolt recess 22 of the receiving panel 20. Further, the outer diameter of the enlarged head 52 is larger than the width of the passage 313 of the mounting sheet 31 and the width of the passage 332 of the auxiliary sheet 33.

Figure 5:
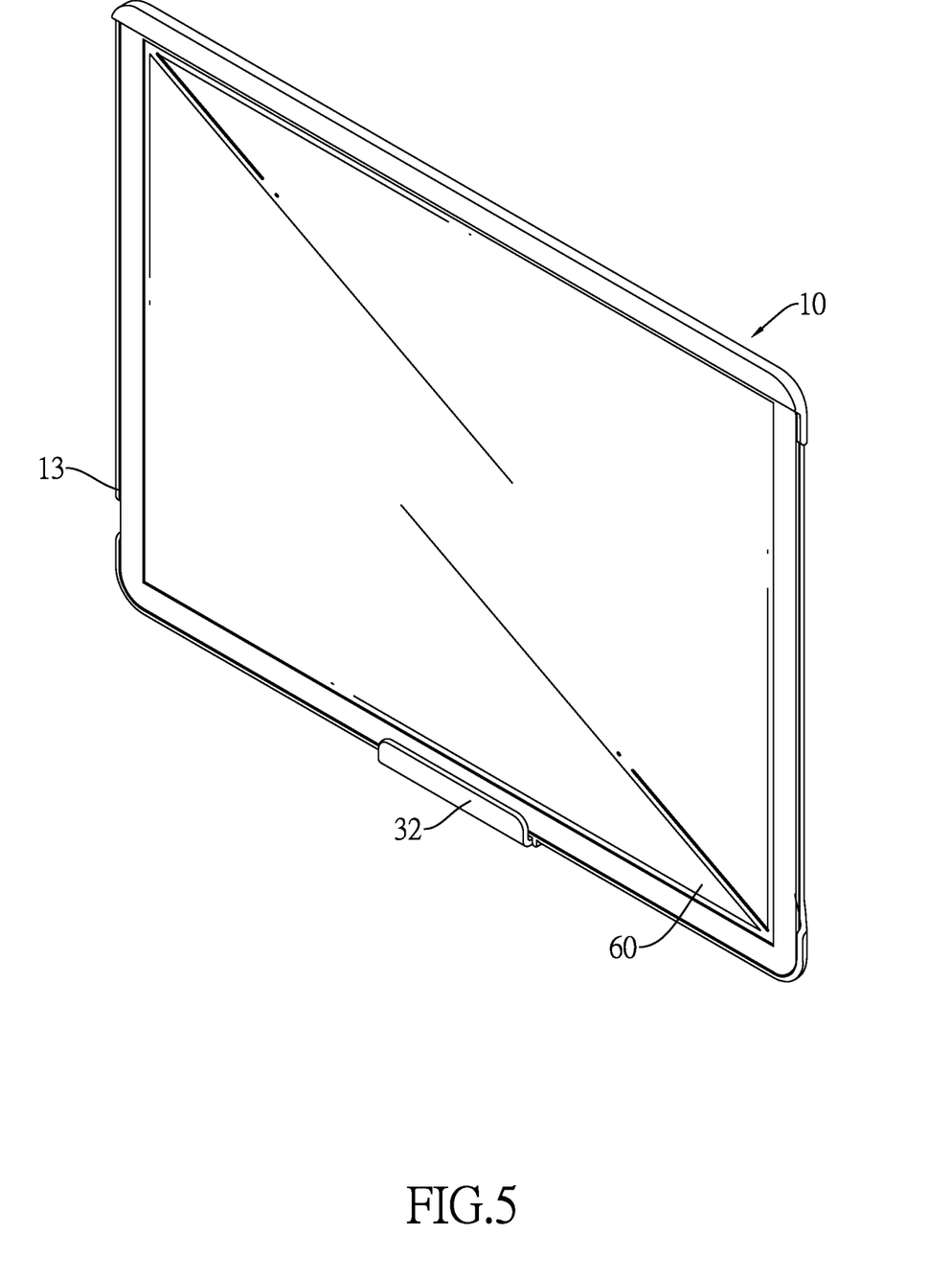
FIG. 5 is an operational perspective view of the protecting casing in FIG. 1 mounted around the portable electronic device.
Figure 6:
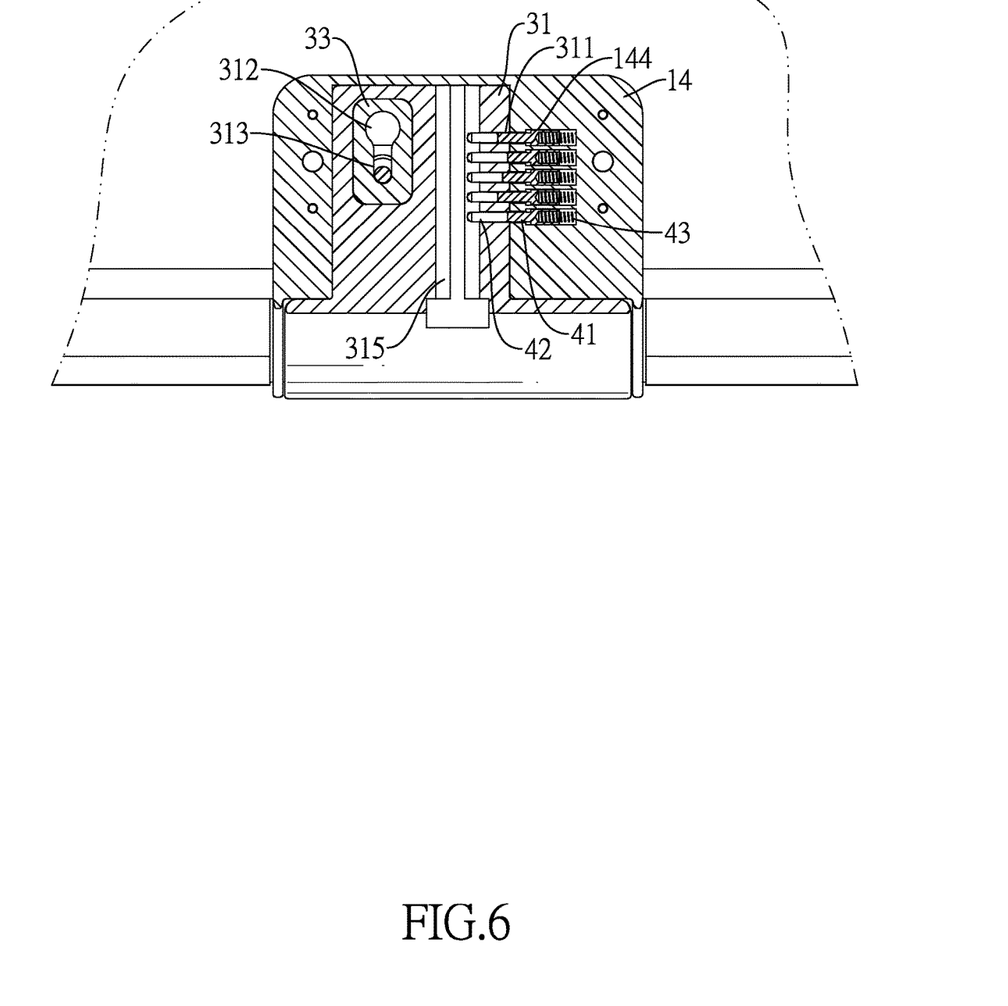
FIG. 6 is an enlarged operational rear view in partial section of the protecting casing in FIG. 1, shown locked.
Figure 7:
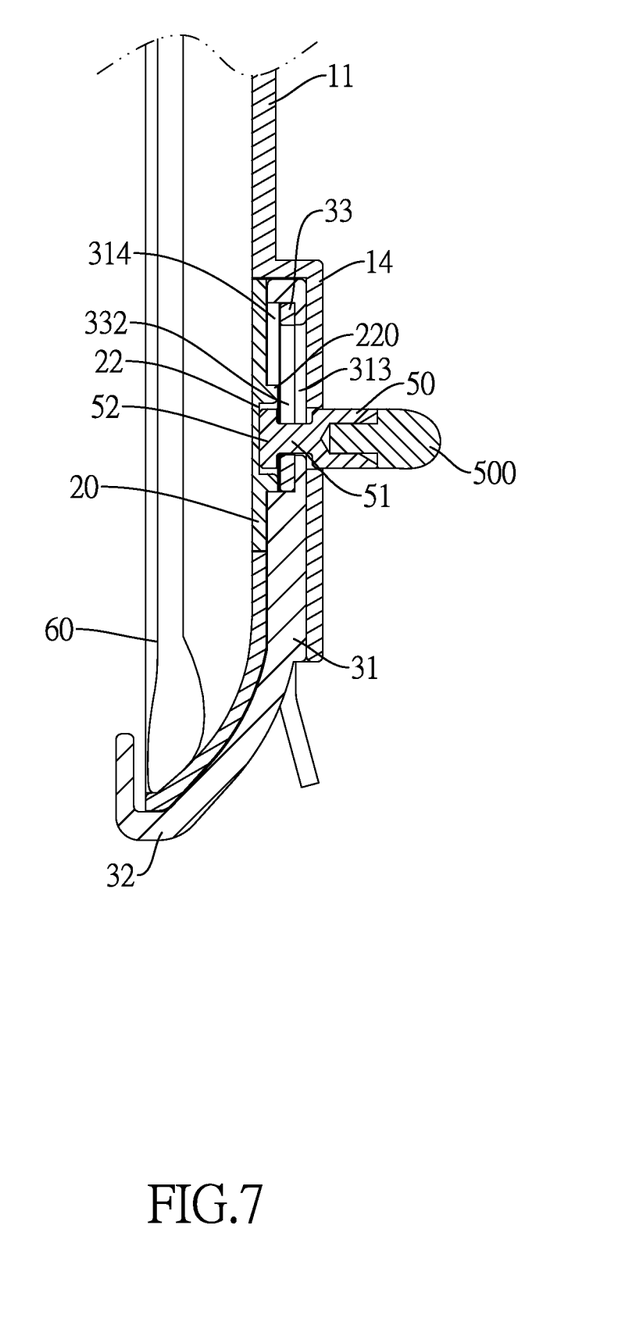
FIG. 7 is an enlarged operational side view in partial section of the protecting casing with the portable electronic device, shown locked.
Figure 8:
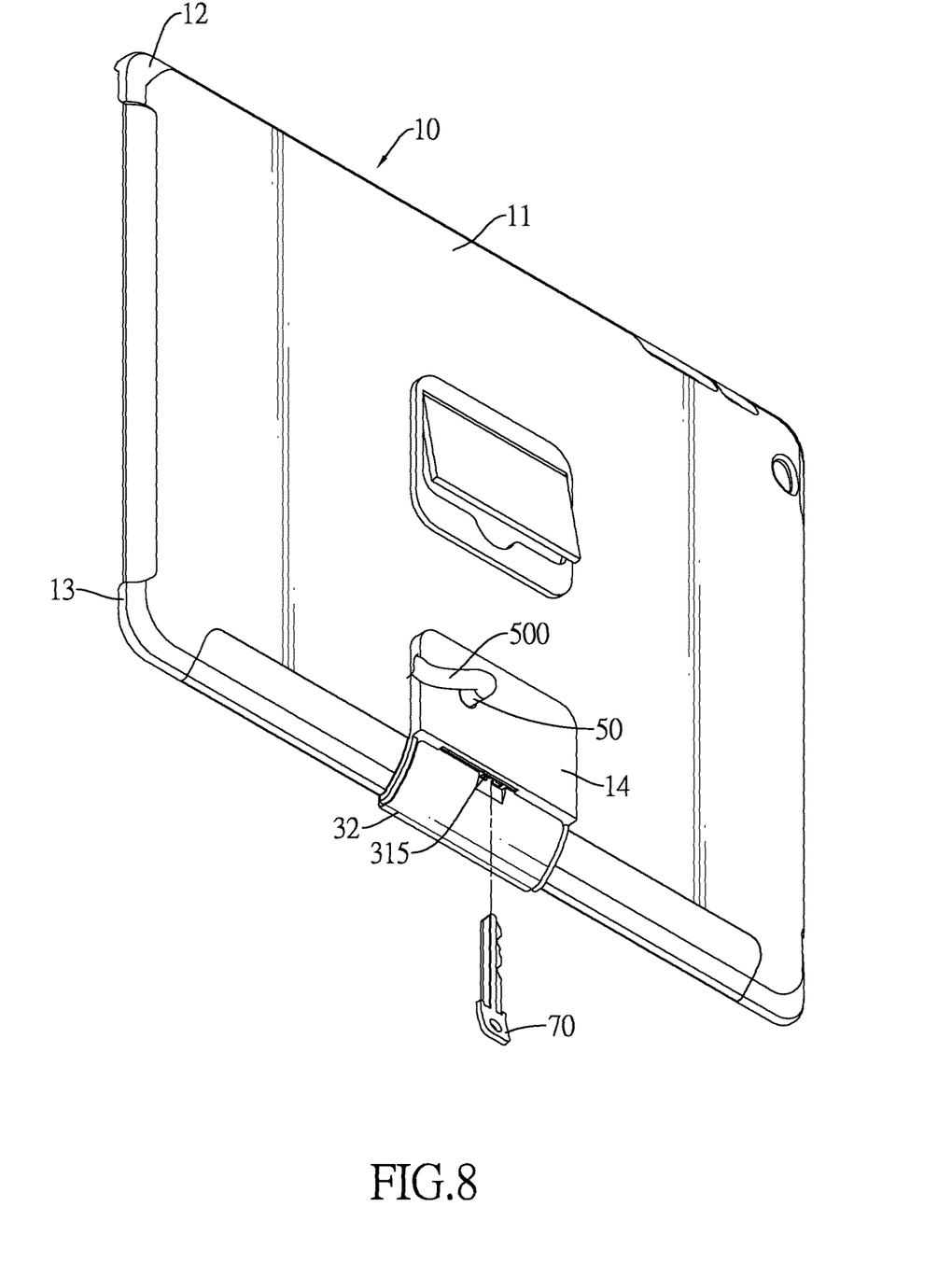
FIG. 8 is an operational perspective view of the protecting casing with the key.
Figure 9:
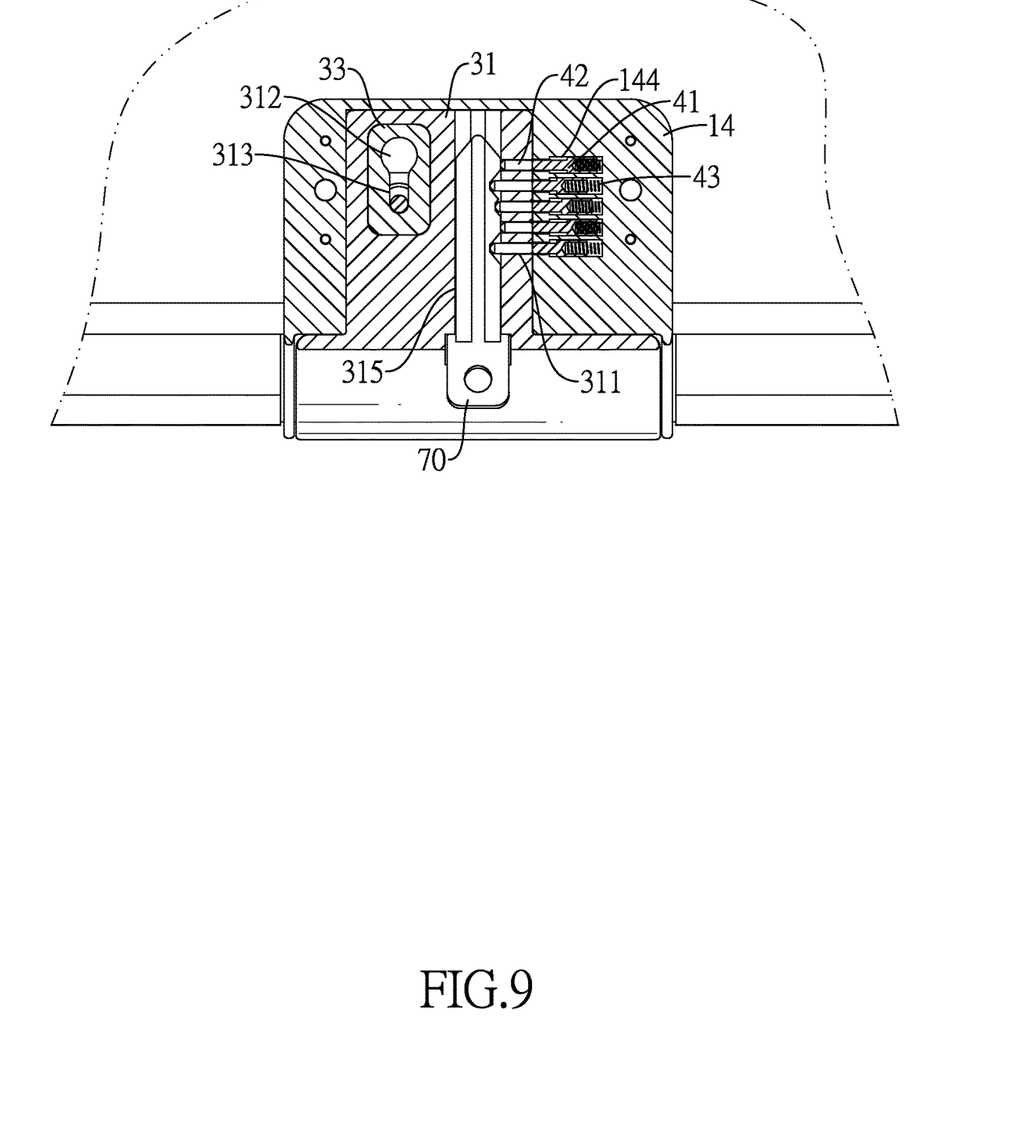
FIG. 9 is an enlarged operational rear view in partial section of the protecting casing with the key, shown being unlocked.
Figure 10:
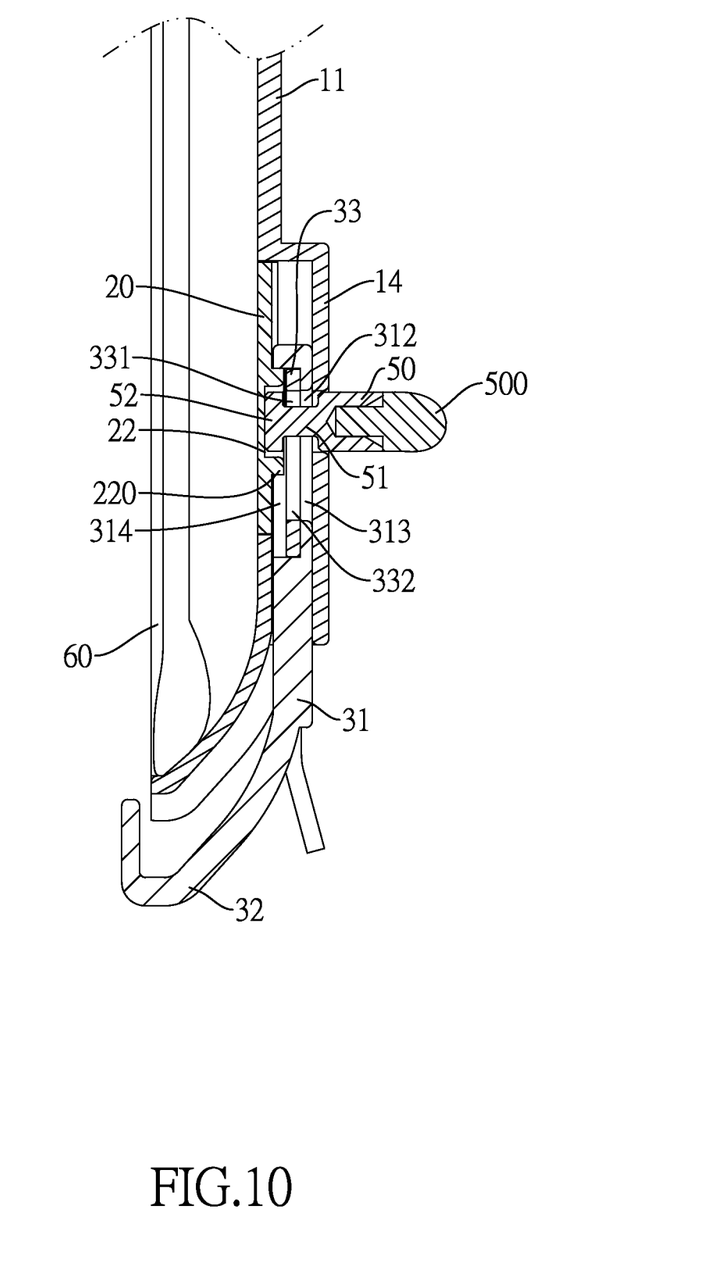
FIG. 10 is an enlarged operational side view in partial section of the protecting casing with the portable electronic device, shown unlocked.
Figure 11:
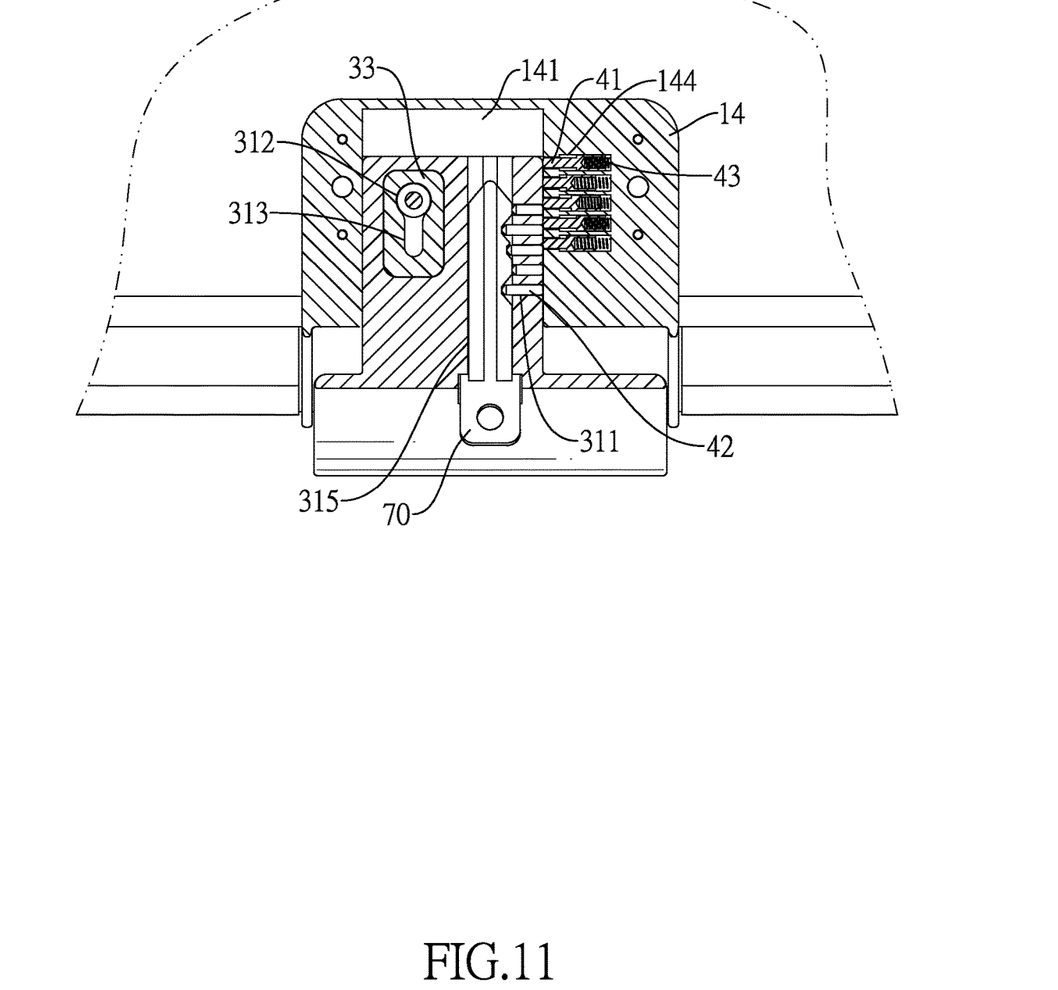
FIG. 11 an enlarged operational rear view in partial section of the protecting casing with the key, shown unlocked.

With reference to FIGS. 5 to 7, the protecting casing as described is mounted around the electronic device 60. The base 11 is attached to the bottom surface of the electronic device 60. The annular flange 13 abuts the periphery edge of the electronic device 60. When the lock cylinder 40 is locked, the front locking pins 41 are pushed by the springs 43 to extend into the pin recesses 311 of the mounting sheet 31 so that the mounting sheet 31 is kept from moving relative to the shell 10. Thus, the clamping sheet 32 stays in front of the top surface of the electronic device 60 to keep the protecting casing as described from easily detaching from the electronic device 60.

Meanwhile, the passage 313 of the mounting sheet 31, the passage 332 of the auxiliary sheet 33, the bolt hole 143 of the lid 14, and the bolt recess 22 of the receiving panel 20 align with each other. Since the outer diameter of the enlarged head 52 of the bolt 50 is larger than the width of the passage 313 of the mounting sheet 31 and the width of the passage 332 of the auxiliary sheet 33, the bolt 50 is blocked by the mounting sheet 31 and the auxiliary sheet 33 and is kept in the lid 14. Therefore, the bolt 50 is locked on the shell 10 and the user can bind the electronic device 60 to other fixtures such as table or wall through the cable 500 to keep the electronic device 60 from being stolen.

With reference to FIGS. 8 to 11, the key 70 is inserted into the keyhole 315 to unlock the lock cylinder 40. The key 70 pushes the rear locking pins 42 to push the front locking pins 41 and to compress the springs 43 so that the front locking pins 41 are retracted into the pin grooves 144 of the lid 14. Then the contacting faces between the front and rear locking pins 41, 42 align with the contacting face between the mounting sheet 31 and the stepped surface of the lid 14 so that the mounting sheet 31 can slide relative to the shell 10. Thus, the clamping sheet 32 leaves the top surface of the electronic device 60 to allow the protecting casing as described to easily detach from the electronic device 60.

Meanwhile, the bolt hole 143 of the lid 14, the bolt hole 312 of the mounting sheet 31, the bolt hole 331 of the auxiliary sheet 33, and the bolt recess 22 of the receiving panel 20 align with each other. Since the outer diameter of the enlarged head 52 corresponds to the diameters of the bolt hole 143 of the lid 14, the bolt hole 312 of the mounting sheet 31, the bolt hole 331 of the auxiliary sheet 33, and the bolt recess 22 of the receiving panel 20, the bolt 50 is free to pass through the bolt hole 143 of the lid 14 and to detach from the actuating panel 30. Therefore, the protecting casing as described and the portable electronic device 60 are allowed to be carried as desired.

The present invention has the following advantages. The lock cylinder 40 cooperates with the actuating panel 30 to strengthen the bonding between the protecting casing as described with the portable electronic device 60 so that the protecting casing as described is not easily detached from the portable electronic device 60. Further, the bolt 50 and the cable 500 allow the portable electronic device 60 to be fastened at a fixed position through the protecting casing as described. When the portable electronic device 60 is used or displayed in public, the bolt 50 and the cable 500 keep the portable electronic device 60 from being stolen.

Figure 12:
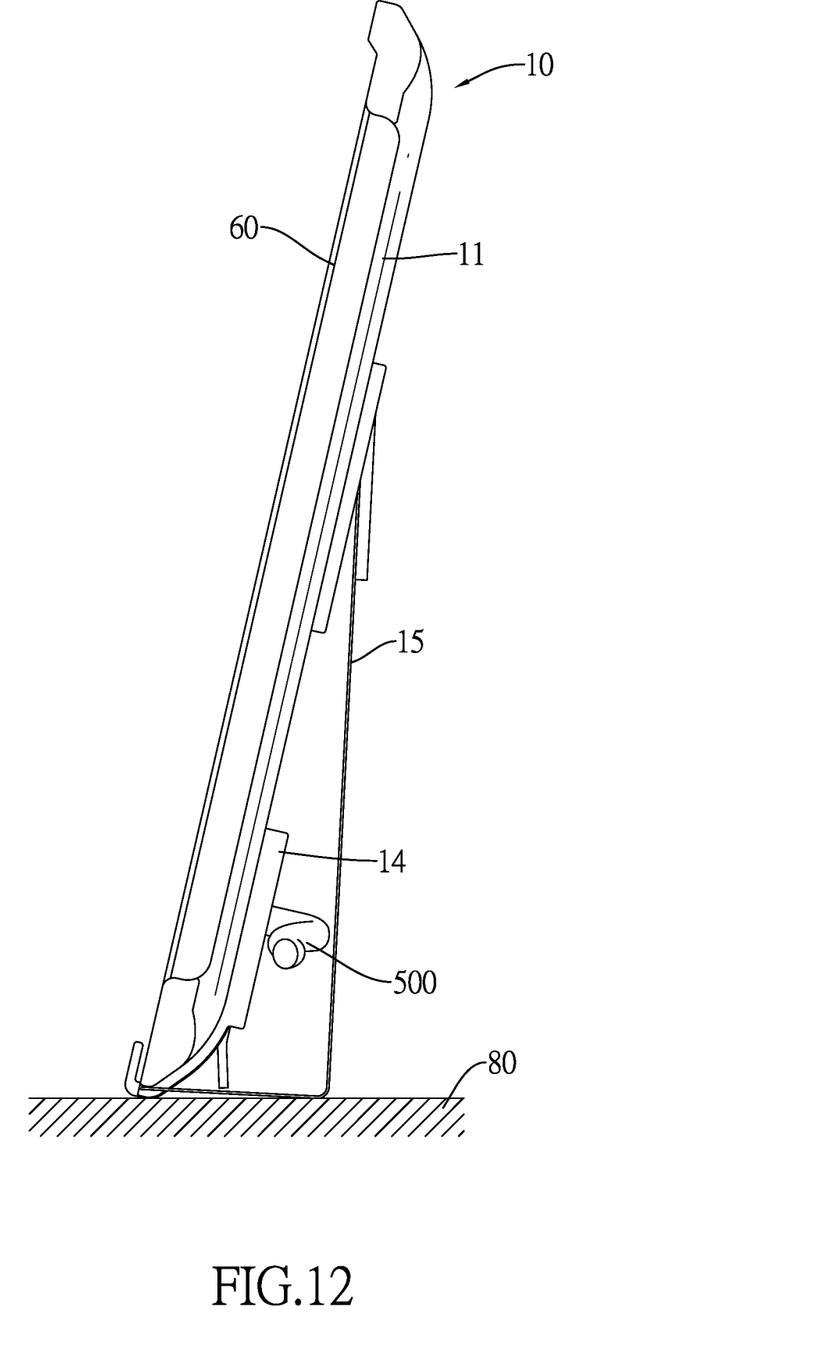
FIG. 12 is an operational side view of the protecting casing with the portable electronic device and the supporting bracket.

With further reference to FIG. 12, the protecting casing as described may comprise a supporting bracket 15 connected detachably to the shell 10 to hold the portable electronic device 60 to stand on the table 80.

Even though numerous characteristics and advantages of the present invention have been set forth in the foregoing description, together with details of the structure and features of the invention, the disclosure is illustrative only.

Changes may be made in the details, especially in matters of shape, size, and arrangement of parts within the principles of the invention to the full extent indicated by the broad general meaning of the terms in which the appended claims are expressed.

What is claimed is:

1. A protecting casing for a portable electronic device comprising:
   a shell having
      a base having a peripheral edge being bent to form a surrounding wall, and a peripheral edge of the surrounding wall being bent to form an annular flange;
      a lid formed on a rear surface of the base and formed near a side of the annular flange; and
      a receiving space formed through the base and corresponding to the lid;
   an actuating panel connected detachably to the shell and comprising
      a mounting sheet mounted slidably in the receiving space of the shell; and
      a curved clamping sheet formed on and extending from an end of the mounting sheet, and crossing over a lower edge of the surrounding wall and a front edge of the annular flange of the shell; and
   a lock cylinder mounted in the receiving space of the shell and mounted between the shell and the mounting sheet, wherein the mounting sheet is kept in the shell when the lock cylinder is locked; and the mounting sheet is free to leave the shell when the lock cylinder is unlocked.

2. The protecting casing as claimed in claim 1 further comprising a receiving panel mounted securely on a front surface of the base and covering the receiving space.

3. The protecting casing as claimed in claim 2 further comprising a bolt, wherein
   the lid has a bolt hole formed through a rear surface of the lid;
   the receiving panel has a bolt recess formed on the receiving panel and aligning with the bolt hole of the lid;
   the mounting sheet has a bolt hole and a passage formed through the mounting sheet, communicating with each other and selectively aligning with the bolt recess of the receiving panel and the bolt hole of the lid, wherein a width of the passage of the mounting sheet is smaller than a diameter of the bolt hole of the mounting sheet, is smaller than a diameter of the bolt recess of the receiving panel, and is smaller than a diameter of the bolt hole of the lid; and
   the bolt is mounted detachably through the lid, the mounting sheet of the actuating panel, and the receiving panel, and the bolt has
      a neck formed on an end of the bolt;
      an enlarged head formed on an end of the neck, whereby
   an outer diameter of the enlarged head is larger than an outer diameter of the neck; the outer diameter of the enlarged head corresponds to the diameters of the bolt hole of the lid, the bolt hole of the mounting sheet, and the bolt recess of the receiving panel; and the outer diameter of the enlarged head is larger than the width of the passage of the mounting sheet.

4. The protecting casing as claimed in claim 3 further comprising a cable connected to the bolt.

5. The protecting casing as claimed in claim 3, wherein
   the mounting sheet has a bolt recess formed on a front surface of the mounting sheet and corresponding to and communicating with the bolt hole and the passage of the mounting sheet; and
   the actuating panel has an auxiliary sheet mounted in the bolt recess of the mounting sheet and having
      a bolt hole formed through the auxiliary sheet, aligning with and having the same size with the bolt hole of the mounting sheet; and
      a passage formed through the auxiliary sheet, aligning with and having the same size with the passage of the mounting sheet.

6. The protecting casing as claimed in claim 4, wherein
   the mounting sheet has a bolt recess formed on a front surface of the mounting sheet and corresponding to and communicating with the bolt hole and the passage of the mounting sheet; and
   the actuating panel has an auxiliary sheet mounted in the bolt recess of the mounting sheet and having
      a bolt hole formed through the auxiliary sheet, aligning with and having the same size with the bolt hole of the mounting sheet; and
      a passage formed through the auxiliary sheet, aligning with and having the same size with the passage of the mounting sheet.

7. The protecting casing as claimed in claim 5, wherein the receiving panel has a stage extending from the receiving panel, formed around the bolt recess of the receiving panel, and mounted in the bolt recess of the mounting sheet.

8. The protecting casing as claimed in claim 6, wherein the receiving panel has a stage extending from the receiving panel, formed around the bolt recess of the receiving panel, and mounted in the bolt recess of the mounting sheet.

9. The protecting casing as claimed in claim 1, wherein
   the lid has
      an opening formed through an end of the lid;
      a stepped surface formed on the lid; and
      multiple pin grooves formed on the stepped surface and communicating with the receiving space;
   the mounting sheet has
      multiple pin recesses formed on a side edge of the mounting sheet, and each pin recess of the mounting sheet selectively aligning with one of the pin grooves of the lid; and
      a keyhole formed through an end of the mounting sheet and communicating with the pin recesses; and
   the lock cylinder comprises
      multiple front locking pins mounted respectively in the pin grooves of the lid and selectively extending respectively into the pin recesses of the mounting sheet;
      multiple rear locking pins mounted respectively in the pin recesses of the mounting sheet of the actuating panel and respectively abutting against the front locking pins; and
      multiple springs mounted respectively in the pin grooves of the lid, and each spring clamped between a corresponding front locking pin and an inner wall of the lid.

10. The protecting casing as claimed in claim 2, wherein
   the lid has
      an opening formed through an end of the lid;
      a stepped surface formed on the lid; and
      multiple pin grooves formed on the stepped surface and communicating with the receiving space;

the mounting sheet has
- multiple pin recesses formed on a side edge of the mounting sheet, and each pin recess of the mounting sheet selectively aligning with one of the pin grooves of the lid; and
- a keyhole formed through an end of the mounting sheet and communicating with the pin recesses; and the lock cylinder comprises
- multiple front locking pins mounted respectively in the pin grooves of the lid and selectively extending respectively into the pin recesses of the mounting sheet;
- multiple rear locking pins mounted respectively in the pin recesses of the mounting sheet of the actuating panel and respectively abutting against the front locking pins; and
- multiple springs mounted respectively in the pin grooves of the lid, and each spring clamped between a corresponding front locking pin and an inner wall of the lid.

11. The protecting casing as claimed in claim 3, wherein the lid has
- an opening formed through an end of the lid;
- a stepped surface formed on the lid; and
- multiple pin grooves formed on the stepped surface and communicating with the receiving space;

the mounting sheet has
- multiple pin recesses formed on a side edge of the mounting sheet, and each pin recess of the mounting sheet selectively aligning with one of the pin grooves of the lid; and
- a keyhole formed through an end of the mounting sheet and communicating with the pin recesses; and the lock cylinder comprises
- multiple front locking pins mounted respectively in the pin grooves of the lid and selectively extending respectively into the pin recesses of the mounting sheet;
- multiple rear locking pins mounted respectively in the pin recesses of the mounting sheet of the actuating panel and respectively abutting against the front locking pins; and
- multiple springs mounted respectively in the pin grooves of the lid, and each spring clamped between a corresponding front locking pin and an inner wall of the lid.

12. The protecting casing as claimed in claim 4, wherein the lid has
- an opening formed through an end of the lid;
- a stepped surface formed on the lid; and
- multiple pin grooves formed on the stepped surface and communicating with the receiving space;

the mounting sheet has
- multiple pin recesses formed on a side edge of the mounting sheet, and each pin recess of the mounting sheet selectively aligning with one of the pin grooves of the lid; and
- a keyhole formed through an end of the mounting sheet and communicating with the pin recesses; and the lock cylinder comprises
- multiple front locking pins mounted respectively in the pin grooves of the lid and selectively extending respectively into the pin recesses of the mounting sheet;
- multiple rear locking pins mounted respectively in the pin recesses of the mounting sheet of the actuating panel and respectively abutting against the front locking pins; and
- multiple springs mounted respectively in the pin grooves of the lid, and each spring clamped between a corresponding front locking pin and an inner wall of the lid.

13. The protecting casing as claimed in claim 5, wherein the lid has
- an opening formed through an end of the lid;
- a stepped surface formed on the lid; and
- multiple pin grooves formed on the stepped surface and communicating with the receiving space;

the mounting sheet has
- multiple pin recesses formed on a side edge of the mounting sheet, and each pin recess of the mounting sheet selectively aligning with one of the pin grooves of the lid; and
- a keyhole formed through an end of the mounting sheet and communicating with the pin recesses; and the lock cylinder comprises
- multiple front locking pins mounted respectively in the pin grooves of the lid and selectively extending respectively into the pin recesses of the mounting sheet;
- multiple rear locking pins mounted respectively in the pin recesses of the mounting sheet of the actuating panel and respectively abutting against the front locking pins; and
- multiple springs mounted respectively in the pin grooves of the lid, and each spring clamped between a corresponding front locking pin and an inner wall of the lid.

14. The protecting casing as claimed in claim 6, wherein the lid has
- an opening formed through an end of the lid;
- a stepped surface formed on the lid; and
- multiple pin grooves formed on the stepped surface and communicating with the receiving space;

the mounting sheet has
- multiple pin recesses formed on a side edge of the mounting sheet, and each pin recess of the mounting sheet selectively aligning with one of the pin grooves of the lid; and
- a keyhole formed through an end of the mounting sheet and communicating with the pin recesses; and the lock cylinder comprises
- multiple front locking pins mounted respectively in the pin grooves of the lid and selectively extending respectively into the pin recesses of the mounting sheet;
- multiple rear locking pins mounted respectively in the pin recesses of the mounting sheet of the actuating panel and respectively abutting against the front locking pins; and
- multiple springs mounted respectively in the pin grooves of the lid, and each spring clamped between a corresponding front locking pin and an inner wall of the lid.

15. The protecting casing as claimed in claim 7, wherein the lid has
- an opening formed through an end of the lid;
- a stepped surface formed on the lid; and
- multiple pin grooves formed on the stepped surface and communicating with the receiving space;

the mounting sheet has
multiple pin recesses formed on a side edge of the mounting sheet, and each pin recess of the mounting sheet selectively aligning with one of the pin grooves of the lid; and
a keyhole formed through an end of the mounting sheet and communicating with the pin recesses; and
the lock cylinder comprises
multiple front locking pins mounted respectively in the pin grooves of the lid and selectively extending respectively into the pin recesses of the mounting sheet;
multiple rear locking pins mounted respectively in the pin recesses of the mounting sheet of the actuating panel and respectively abutting against the front locking pins; and
multiple springs mounted respectively in the pin grooves of the lid, and each spring clamped between a corresponding front locking pin and an inner wall of the lid.

16. The protecting casing as claimed in claim 8, wherein the lid has
an opening formed through an end of the lid;
a stepped surface formed on the lid; and
multiple pin grooves formed on the stepped surface and communicating with the receiving space;
the mounting sheet has
multiple pin recesses formed on a side edge of the mounting sheet, and each pin recess of the mounting sheet selectively aligning with one of the pin grooves of the lid; and
a keyhole formed through an end of the mounting sheet and communicating with the pin recesses; and
the lock cylinder comprises
multiple front locking pins mounted respectively in the pin grooves of the lid and selectively extending respectively into the pin recesses of the mounting sheet;
multiple rear locking pins mounted respectively in the pin recesses of the mounting sheet of the actuating panel and respectively abutting against the front locking pins; and
multiple springs mounted respectively in the pin grooves of the lid, and each spring clamped between a corresponding front locking pin and an inner wall of the lid.

17. The protecting casing as claimed in claim 1 further comprising a supporting bracket connected detachably to the shell.

18. The protecting casing as claimed in claim 2 further comprising a supporting bracket connected detachably to the shell.

19. The protecting casing as claimed in claim 9 further comprising a supporting bracket connected detachably to the shell.

20. The protecting casing as claimed in claim 16 further comprising a supporting bracket connected detachably to the shell.

* * * * *